US006631774B2

United States Patent
Hayashi (10) Patent No.: US 6,631,774 B2
(45) Date of Patent: Oct. 14, 2003

(54) ELECTRIC MOTOR VEHICLE (75) Inventor: Kunihiro Hayashi, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/887,896

(22) Filed: Jun. 22, 2001

(65) Prior Publication Data

US 2002/0003052 A1 Jan. 10, 2002

(30) Foreign Application Priority Data

Jul. 6, 2000  (JP) ........................................ 2000-205459

(51) Int. Cl.[7] ............................................... B60K 1/00
(52) U.S. Cl. .................................. 180/65.1; 297/188.14
(58) Field of Search ................... 297/188.17, 188.16, 297/188.14; 248/153; 296/37.1, 153; 280/DIG. 5; 180/65.1, 68.5, 907

(56) References Cited

U.S. PATENT DOCUMENTS

| 1,514,058 A | * | 11/1924 | Leitzen ........................ 180/68.5 |
| 2,109,316 A | * | 2/1938 | Harley ......................... 180/68.5 |
| 2,494,838 A | * | 1/1950 | Slaughter |
| 4,023,873 A | * | 5/1977 | Barker ......................... 296/153 |
| 4,339,061 A | * | 7/1982 | Dunn |
| 4,453,760 A | * | 6/1984 | Hira ............................. 296/153 |
| 4,613,151 A | * | 9/1986 | Kielczewski ................ 180/68.5 |
| 4,729,447 A | * | 3/1988 | Morse .......................... 180/65.1 |
| 4,730,869 A | * | 3/1988 | Schumacher |
| 4,798,255 A | * | 1/1989 | Wu .............................. 180/65.1 |
| D329,146 S | * | 9/1992 | Neal |
| 5,207,477 A | * | 5/1993 | Maxwell |
| 5,322,140 A | * | 6/1994 | Bussinger ................... 180/65.1 |
| 5,732,788 A | * | 3/1998 | Brown ....................... 180/907 X |
| 6,095,270 A | * | 8/2000 | Ishikawa .................... 180/68.5 |
| 6,196,605 B1 | * | 3/2001 | Baldas et al. ................ 296/153 |

FOREIGN PATENT DOCUMENTS

| JP | 10211238 | 8/1998 | ............ A61G/5/04 |
| JP | 10211240 | 8/1998 | ............ A61G/5/04 |
| JP | 11-076313 | 4/1999 | |
| JP | 2000 51279 | 2/2000 | |

* cited by examiner

Primary Examiner—Brian L. Johnson
Assistant Examiner—Bryan Fischmann
(74) Attorney, Agent, or Firm—Darby & Darby (57) ABSTRACT

An electric motor vehicle with a battery mounted for supplying electric energy to the motor for driving the wheels has a pair of armrest bodies arranged on both sides of the seat, each armrest body having a battery storage compartment in which the battery can be detachably set and having an armrest cushion on the top thereof which serves as a lid that can open and close the battery storage compartment.

8 Claims, 8 Drawing Sheets

ELECTRIC MOTOR VEHICLE

BACKGROUND OF THE INVENTION (1) Field of the Invention

The present invention relates to an electric motor vehicle including a battery as the power source, and in particular relates to improvement in the battery mounting structure.

(2) Description of the Prior Art

Electric motor vehicles including motor chairs, etc., have battery supplying electronic power to the motor for driving the wheels. This battery is usually mounted at the battery mounting portion arranged at the back of the chair (see Japanese Patent Application Laid-Open Hei 11 No. 76313, Japanese Patent Application Laid-Open Hei 12 No. 51279). There is another known configuration in which batteries are mounted in the battery mounting portions arranged under the armrests on both sides of the seat.

Since the battery in the conventional battery mounting arrangements is mounted at the specially arranged battery mounting portion as stated above, a certain space for the battery mounting portion is needed, and the battery is mounted with a large part of it exposed. Therefore, it is necessary to have a separate fixing device in order to attach the battery to prevent movement. Also, since the battery mounting portion is located at a low site, the user needs to bend over to mount or remove the battery. In particular, it has been difficult for a senior user or disabled person to perform replacement of the battery by themselves.

SUMMARY OF THE INVENTION

The present invention has been devised in view of the above conventional drawbacks and it is therefore an object of the present invention to provide an electric motor vehicle in which the battery is provided as a cartridge and can be simply and easily mounted or removed in vacant space inside the armrests.

In order to achieve the above object, the present invention is configured as follows:

In accordance with the first aspect of the present invention, an electric motor vehicle with a battery for supplying electric energy to the motor for driving the wheels, is characterized in that a pair of armrest bodies is arranged upright, each armrest body having a longer dimension in the front-to-rear direction of the vehicle than the dimension in width when viewed from the top, each armrest has a hollow compartment for battery storage in which the battery can be inserted or removed from the top thereof and has an armrest cushion on the top thereof which serves as a lid that can open and close the battery storage compartment.

In accordance with the second aspect of the present invention, the electric motor vehicle having the above first feature is characterized in that the armrest cushion is hinged at the top end of the armrest body so as to open and close the battery storage compartment, at least the front-side piping of the armrest frame is exposed to the interior of the battery storage compartment so as to guide the battery by fitting the piping to the depressed portion formed at least on the front side of the battery.

In accordance with the third aspect of the present invention, the electric motor vehicle having the above first feature is characterized in that the armrest body and armrest cushion are inclined forwards so that the battery set in the battery storage compartment can be accommodated in close contact with the armrest frame.

In accordance with the fourth aspect of the present invention, the electric motor vehicle having the above second feature is characterized in that the armrest body and armrest cushion are inclined forwards so that the battery set in the battery storage compartment can be accommodated in close contact with the armrest frame.

In accordance with the fifth aspect of the present invention, the electric motor vehicle having the above first feature is characterized in that the battery is a cartridge type having a handle on the top thereof, the handle projects out above the battery storage portion when set in the battery storage compartment and can be covered and urged downward by the armrest cushion when the armrest cushion is closed.

In accordance with the sixth aspect of the present invention, the electric motor vehicle having the above second feature is characterized in that the battery is a cartridge type having a handle on the top thereof, the handle projects out above the battery storage portion when set in the battery storage compartment and can be covered and urged downward by the armrest cushion when the armrest cushion is closed.

In accordance with the seventh aspect of the present invention, the electric motor vehicle having the above third feature is characterized in that the battery is a cartridge type having a handle on the top thereof, the handle projects out above the battery storage portion when set in the battery storage compartment and can be covered and urged downward by the armrest cushion when the armrest cushion is closed.

In accordance with the eighth aspect of the present invention, the electric motor vehicle having the above fourth feature is characterized in that the battery is a cartridge type having a handle on the top thereof, the handle projects out above the battery storage portion when set in the battery storage compartment and can be covered and urged downward by the armrest cushion when the armrest cushion is closed.

In accordance with the ninth aspect of the present invention, the electric motor vehicle having the above first feature is characterized in that a stuff bucket or box having the same outside dimensions as the battery and formed with a depressed portion on the front side is set in either one of the left and right battery storage compartments of the armrest bodies.

In accordance with the tenth aspect of the present invention, the electric motor vehicles having the above second feature is characterized in that a stuff bucket or box having the same outside dimensions as the battery and formed with a depressed portion on the front side is set in either one of the left and right battery storage compartments of the armrest bodies.

In accordance with the eleventh aspect of the present invention, the electric motor vehicles having the above third feature is characterized in that a stuff bucket or box having the same outside dimensions as the battery and formed with a depressed portion on the front side is set in either one of the left and right battery storage compartments of the armrest bodies.

In accordance with the twelfth aspect of the present invention, the electric motor vehicle having the above with feature is characterized in that a stuff bucket or box having the same outside dimensions as the battery and formed with a depressed portion on the front side is set either one of the left and right battery storage compartments of the armrest bodies.

In accordance with the thirteenth aspect of the present invention, the electric motor vehicles having the above fifth feature is characterized in that a stuff bucket or box having the same outside dimensions as the battery and formed with a depressed portion on the front side is set in either one of the left and right battery storage compartments of the armrest bodies.

In accordance with the fourteenth aspect of the present invention, the electric motor vehicle having the above sixth is characterized in that a stuff bucket or box having the same outside dimensions as the battery and formed with a depressed portion on the front side is set in either one of the left and right battery storage compartments of the armrest bodies.

In accordance with the fifteenth aspect of the present invention, the electric motor vehicle having the above seventh feature is characterized in that a stuff box having the same outside dimensions as the battery and formed with a depressed portion on the front side is set in either one of the left and right battery storage compartments of the armrest bodies.

In accordance with the sixteenth aspect of the present invention, the electric motor vehicle having the above eighth feature is characterized in that a stuff box having the same outside dimensions as the battery and formed with a depressed portion on the front side is set in either one of the left and right battery storage compartments of the armrest bodies.

According to the present invention, since the battery storage portions are formed inside the armrests arranged on both sides of the seat, it is possible to efficiently use the empty spaces inside the armrests. Further since the storage compartment is located under the armrest cushion on which the elbow is put, the battery can be set at a height that allows the user to easily perform replacement of the battery, for instance provided as a cartridge, without bending over.

In the present invention, since the depressed portions formed at least on the front side of the battery can be guided by the armrest frame, this configuration allows the battery to be inserted easily, in alignment, and be mounted and removed easily and prevents the battery from rattling inside the battery storage when moving or in other occasions.

Since the battery is pressed against the front portion due to gravity, it is possible to prevent the battery from rattling when it is mounted.

Since the top handle of the battery projects out above the battery storage and can be covered by the armrest cushion, the handle juts out from the top of the armrest body to be easily held when the armrest cushion is opened. Since the handle can be covered and pressed down by the armrest cushion when the armrest cushion is closed, it is possible to prevent the battery from rattling inside the battery storage and maintain good electric contact with the battery.

DESCRIPTION OF THE PREFERRED EMBODIMENTS

The embodiments of the present invention will hereinafter be described in detail with reference to the accompanying drawings.

Figure 1:
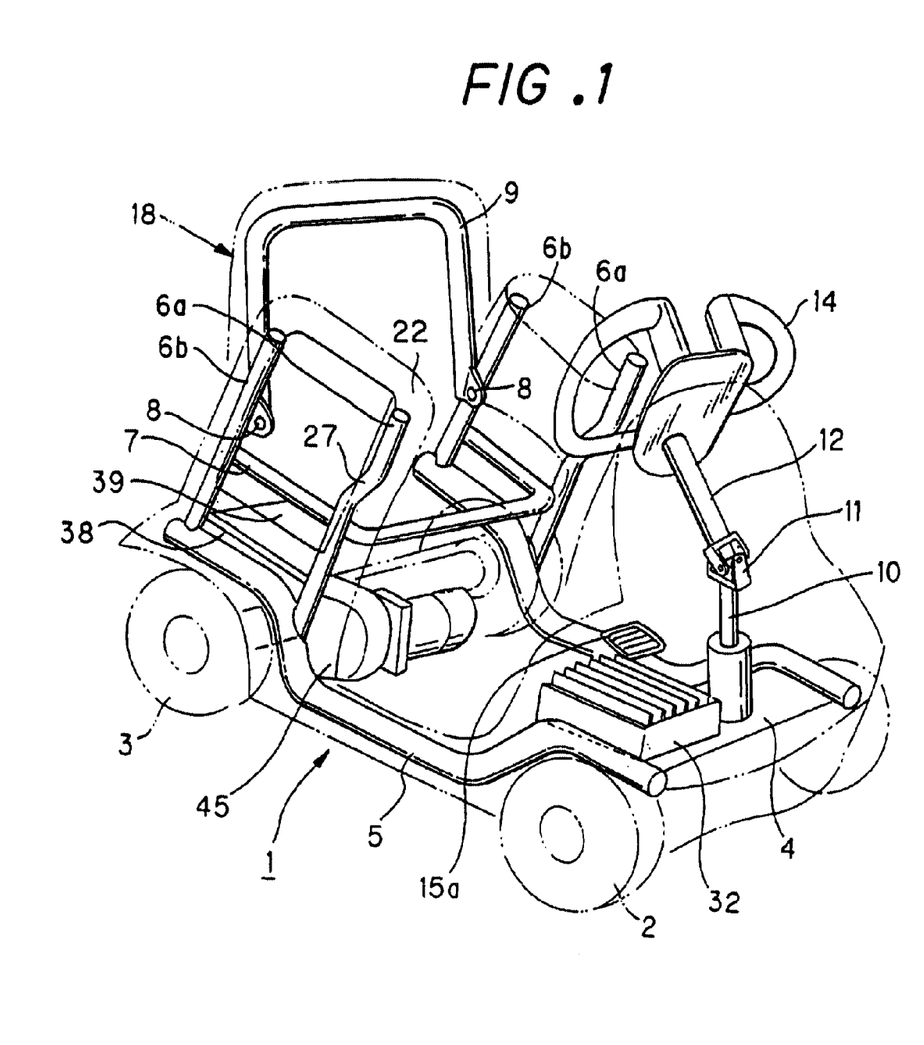
FIG. 1 is a perspective view showing a bodywork frame of an electric motor vehicle according to one embodiment of the present invention.
Figure 2:
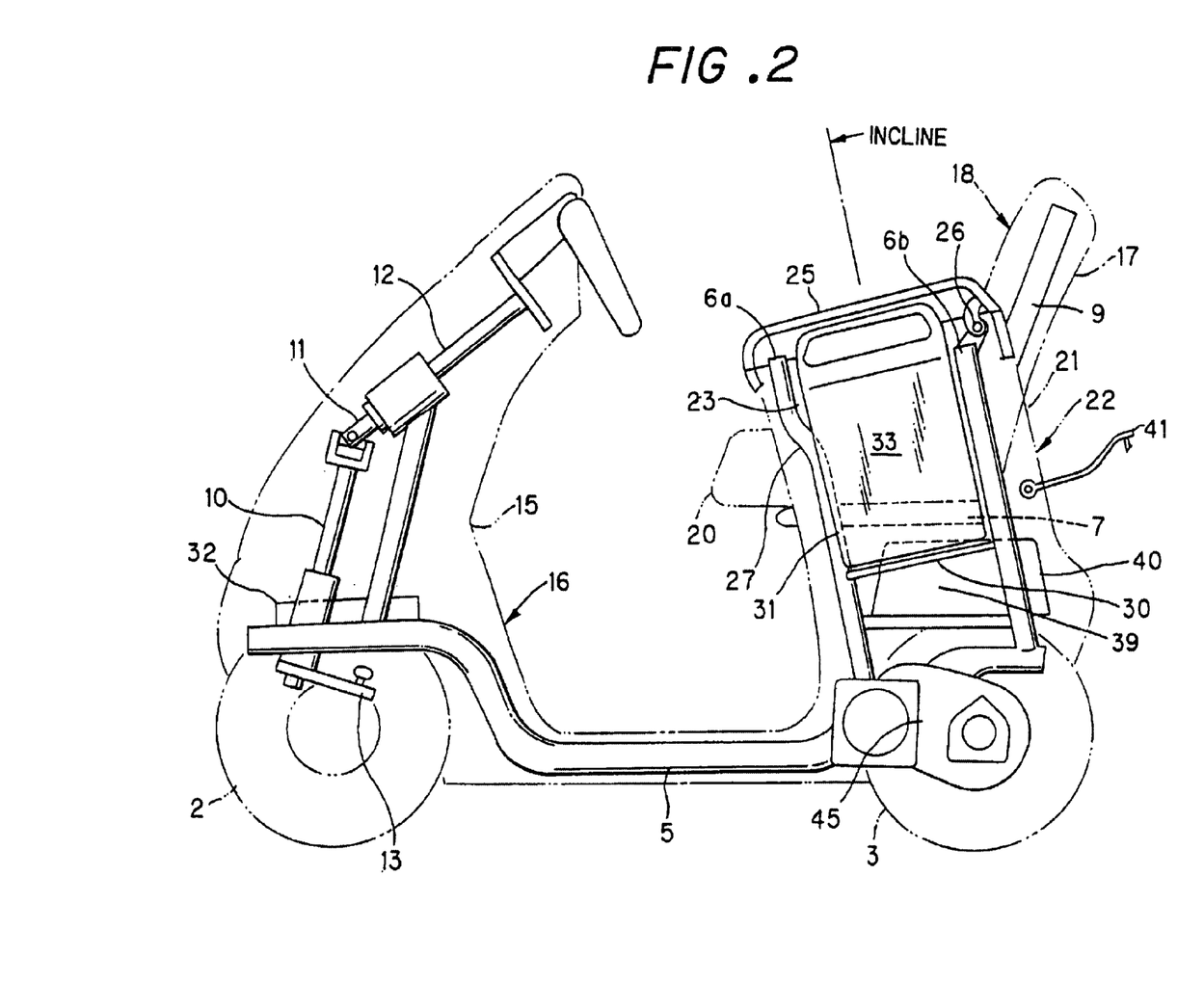
FIG. 2 is a side view showing an electric motor vehicle according to the embodiment of the present invention.
Figure 3:
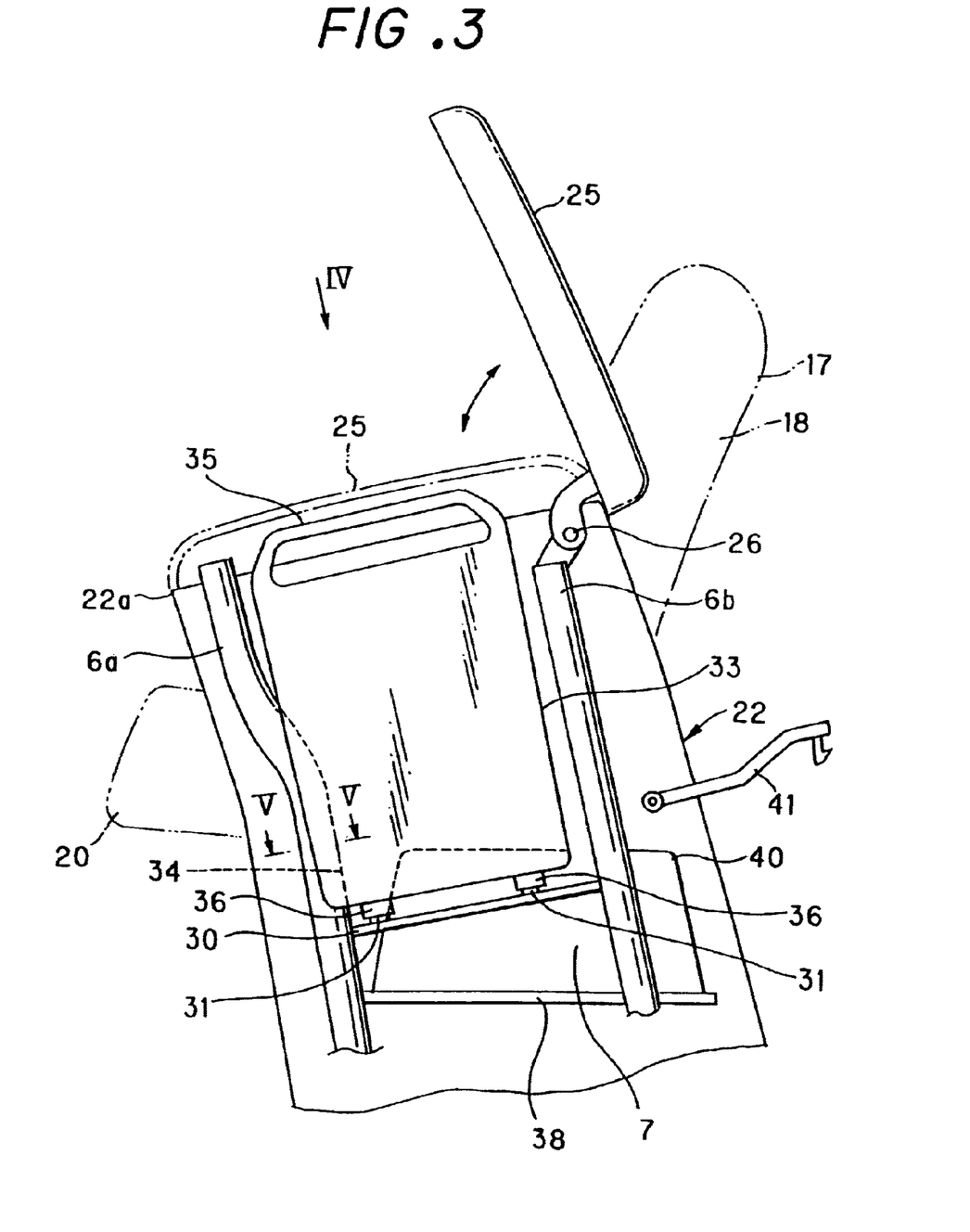
FIG. 3 is a side view showing an armrest in detail.
Figure 4:
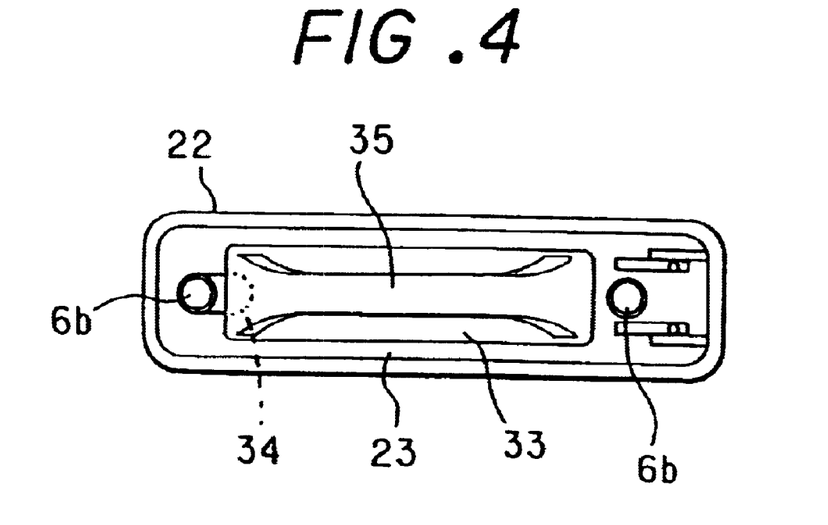
FIG. 4 is a top view showing an armrest.
Figure 5:
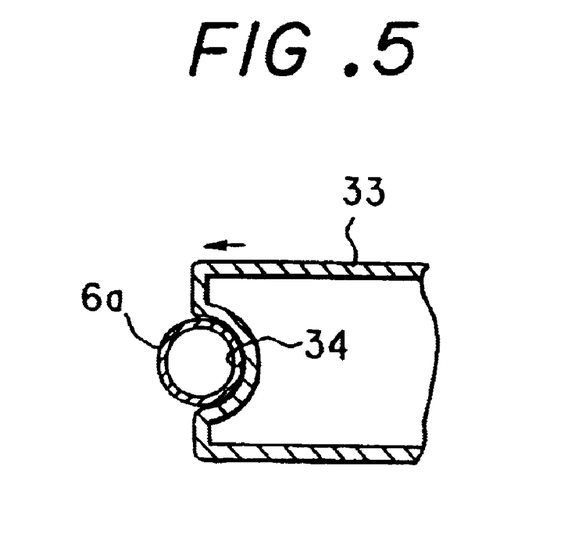
FIG. 5 is a sectional view cut along a plane V—V in FIG. 3.
Figure 6:
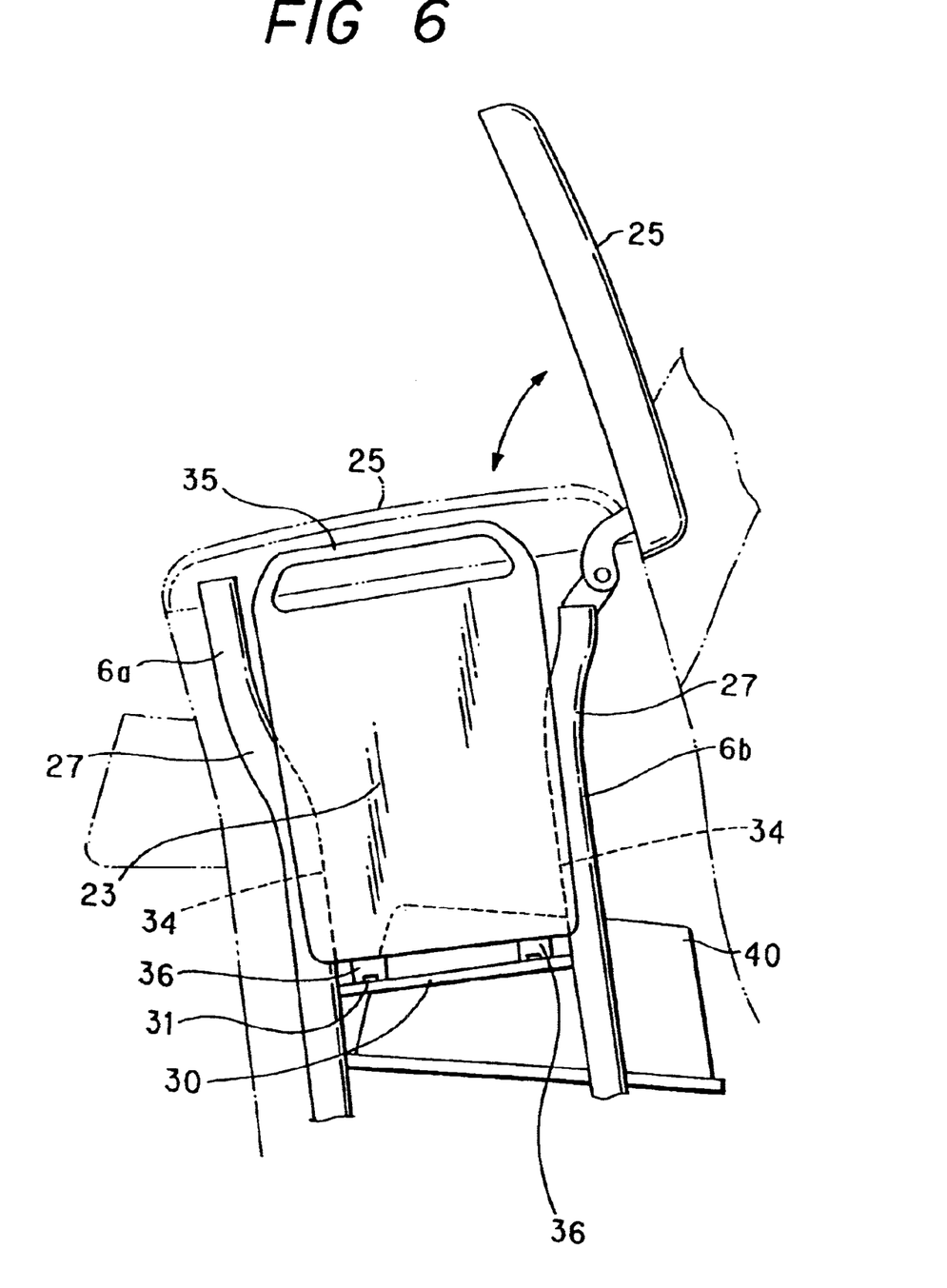
FIG. 6 is a side view partially showing an electric motor vehicle according to another embodiment of the present invention.
Figure 7:
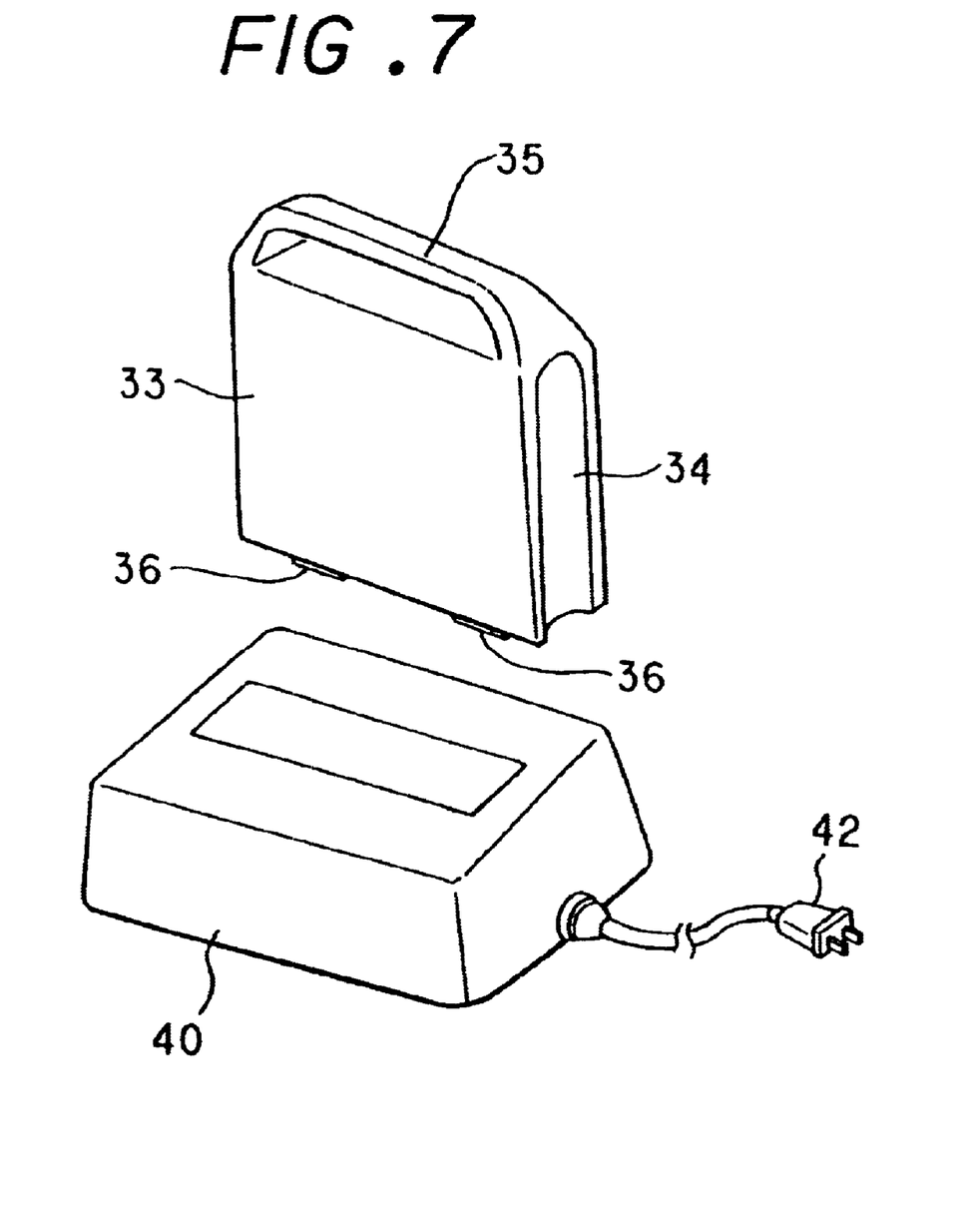
FIG. 7 is a perspective view showing a battery and its charger.
Figure 8:
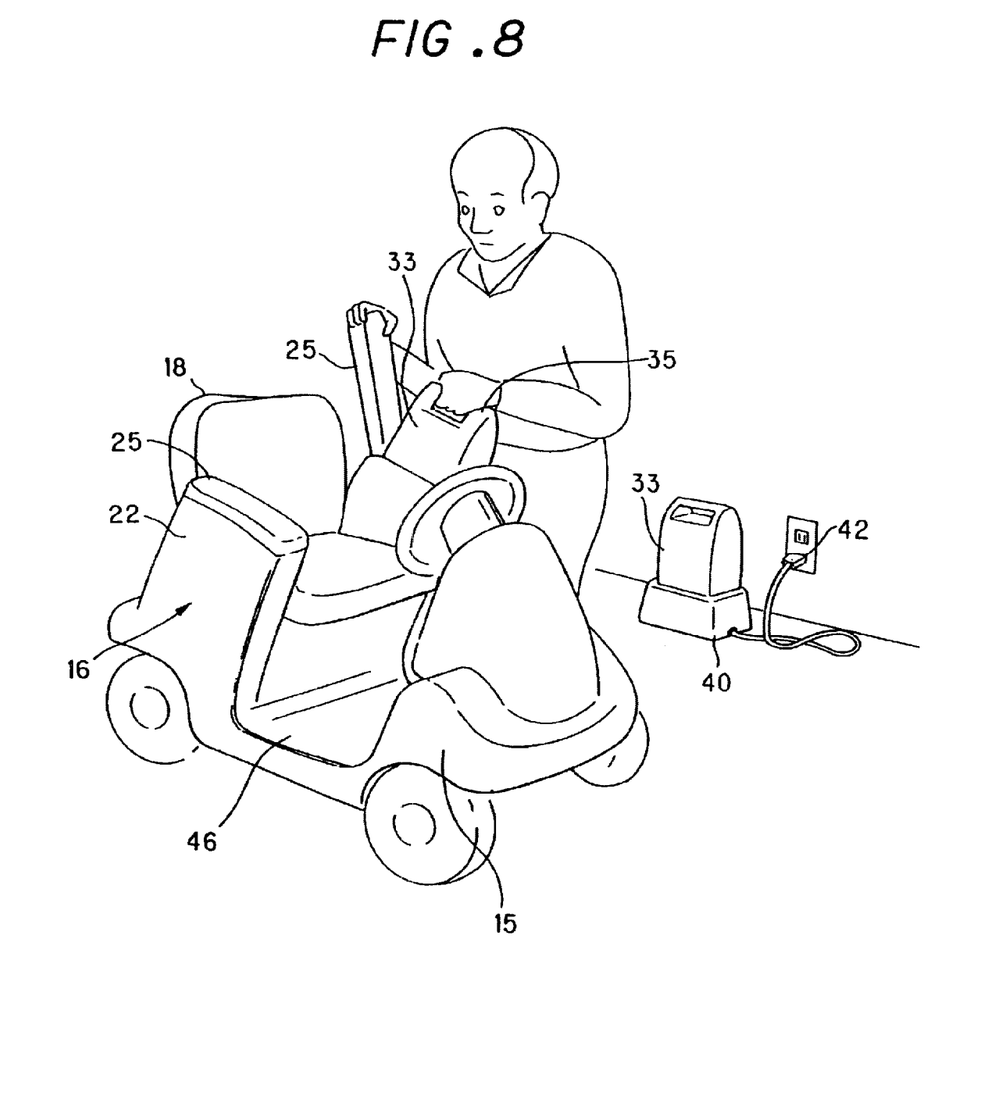
FIG. 8 is a perspective view showing the operations of mounting and removing the battery to or from an electric motor vehicle.
Figure 9:
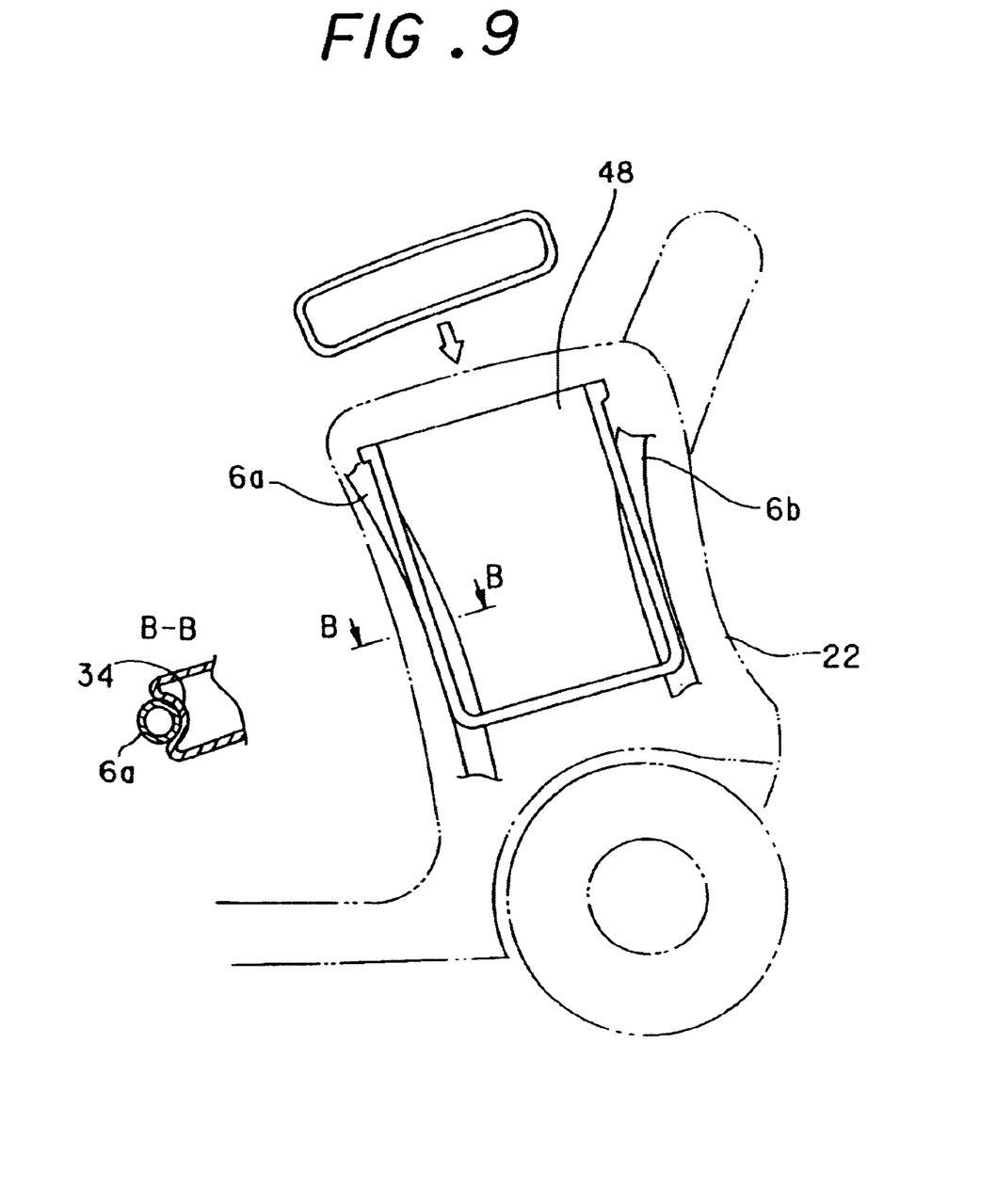
FIG. 9 is an illustrative view showing an example in which one armrest body is used as a storage box.

FIG. 1 is a perspective view showing a bodywork frame of an electric motor vehicle according to one embodiment of the present invention. FIG. 2 is a side view showing an electric motor vehicle according to the embodiment. FIG. 3 is a side view showing an armrest in detail. FIG. 4 is a top view showing the armrest, viewed in the IV direction in FIG. 3. FIG. 5 is a sectional view cut along a plane V—V in FIG. 3. FIG. 6 is aside view partially showing an electric motor vehicle according to another embodiment. FIG. 7 is a perspective view showing a battery and its charger. FIG. 8 is a perspective view showing the operations of mounting and removing the battery to or from an electric motor vehicle. FIG. 9 is an illustrative view showing a box formed in one armrest.

As shown in FIG. 1, the electric motor vehicle such as a wheelchair according to the embodiment has a pair of plate-like armrest bodies 22 arranged on both sides, right and left, of a seat (seat base) 20 so as to embrace the user and includes a relatively lightweight, high-density battery 33 (e.g., Ni—MH, lithium ion batteries) arranged inside the armrest body with its top covered by an armrest cushion so as to enable the user to replace the battery by their hands. The bodywork of the electric motor vehicle has a flat floor 46 located at the lower portion in front of the seat as a footrest and for sitting comfort and has a rising portion for the front structure, so that it assumes an overall U-shaped configuration when viewed from the side.

The bodywork frame, designated at 1, which is made up of pipes to constitute the bodywork of the electric motor vehicle includes: a pair of main frames 5, 5 arranged on the left and right, each having a cranked shape with its center indented downwards, for suspending front wheels 2, 2 and rear wheels 3,3 from above and spanning over between the front wheels 2 and rear wheels 3; pairs of front and rear armrest frames 6a and 6b fixed in the rear part of each of the main frames 5, 5 and extended upward and slightly forwards; a U-shaped seat frame 7 which is positioned with the rear side open between right armrest frames 6a, 6b and left armrest frames 6a, 6b and is attached to their mid points so as to connect them and support the seat cushion thereon; and an inverted U-shaped back seat frame 9 attached to the upper positions of rear armrest frames 6b via hinges 8.

A fixture plate 4 is arranged between the front portions of left and right main frames 5, 5 with a steering shaft 10 for front wheel steerage attached at the center thereof and extended upward. Attached at the top of this steering shaft 10 is a universal joint 11, which is joined to a handle shaft 12. A steering handle 14 is fixed to handle shaft 12. Steering shaft 10 is coupled with front wheels 2 by means of a steering mechanism 13 (see FIG. 2) so as to be able to control steering. A drive unit 45 having an electric motor as a drive source is arranged on the axle of rear wheels 3 under seat base 20.

As shown in FIG. 2, all the parts of the bodywork frame 1 and shafts 10 and 12 are externally covered by a relatively hard, resin-made or metallic cover structure 15, forming an electric motor vehicle body 16 (see FIG. 8). Back seat frame 9 is upholstered with cushions and covered by a soft cladding cover 17, forming a back seat 18. Seat base 20 made up of cushions covered by a soft cladding is attached on seat frame 7.

As shown in FIGS. 1, 2 and 3, armrest frames 6a, 6b are provided inclined forwards. These armrest frames 6a, 6b are cladded by a relatively hard cover element 21 made up of resin or the like, forming armrest body 22 (see FIG. 8). An armrest cushion 25 which is formed of a front-to-rear long plate covered by a cushioned cover is placed over the top of the armrest body 22. This armrest cushion 25 is pivotally attached to armrest frame 6b by means of a hinge 26 so as to cover or uncover the top opening of armrest body 22 as it turns. This armrest body 22 has a hollow space therein which serves as a battery storage compartment 23. Armrest frame 6a is bent forward at a partway position forming a bent portion 27.

A battery supporting plate 30 is attached between the aforementioned front and rear armrest frames 6a and 6b. This battery supporting plate 30 is joined to and at right angles with front and rear armrest frames 6a and 6b. Hence this battery supporting plate 30 is also inclined forwards. Electrode terminals 31 are formed on the top face of battery supporting plate 30. These terminals 31 are connected to a main controller 32 (see FIGS. 1 and 2) by means of an unillustrated wire harness such as electric cables. Main controller 32 is placed on the right side of fixture plate 4 while a vent hole 15a is formed on external body cover 15 so as to permit cooling air to pass therethrough.

Cartridge type battery 33 is accommodated in battery storage portion 23. As shown in FIG. 7, this battery 33 has depressed portions 34 formed on both the front and rear sides with a handle 35 on the top. Battery 33 further has electrodes 36 on the undersurface with elastic cushions formed around the electrodes or at appropriate positions on the underside thereof. The type of this battery 33 is not limited but a lightweight, high-density battery such as a Ni—MH battery or lithium-ion battery is preferably used.

Usually, the height of the armrest of a typical wheel chair from the ground level is about 700 mm, and this is a convenient height for the user in a standing position to perform replacement of the battery, as in this electric motor vehicle shown in FIG. 8. More specifically, setting of battery 33 into battery storage portion 33 is performed by uplifting armrest cushion 25 so as to open the top of battery storage compartment 23 and inserting battery 33 into battery storage compartment 23 by gripping handle 35. The battery 33 slides with one of the depressed portions 34 on both sides of the battery being guided by bent portion 27 of armrest frame 6a and stops and is held by supporting plate 30, and electrodes 36, at the same time, come into contact with terminals 31 to establish conduction.

When battery 33 is accommodated in place, handle 35 is projected beyond the upper boundary, designated at 22a (the abutment face against armrest cushion 25), of armrest body 22. When armrest cushion 25 is closed under this condition, handle 35 is pressed down by an elastic element such as rubber or a spring provided on the underside of armrest cushion 25 so that electrodes 36 come into close contact with terminals 31, to thereby maintain good conduction. If necessary, rubber cushions may be provided on the underside of battery 33 so as to protect the battery from impacts.

Since battery supporting plate 30 is inclined forwards, battery 33 continues being pressed against armrest frame 6a (see FIG. 5) so that the battery is positively held without movement.

Replacement of battery 33 is performed by lifting armrest cushion 25 and pulling out the battery by holding handle 35. In this case, since handle 35 projects out beyond upper boundary 22a of armrest body 22, this allows easy drawing out.

As mentioned already, the height of armrest body 22 can be set at about 700 mm, and as shown in FIG. 8, this allows a normal user to mount or remove battery 33 without bending over. Needless to say, there are two armrest bodies 22 on both sides, left and right, hence while the battery in one armrest body 22 is being used, the other can be kept as a spare battery.

Most of the typical configurations have foldup armrests for allowing the user to get seated easily from the seat side. However in this embodiment, the armrests are fixed and configured in such a manner that each armrest body is integrally extended forwards from the fender of the rear wheel to embrace the user. A seat of this fixed type has the advantage of allowing the disabled user to feel comforted by the sensation of being held.

Since the space under the seat base 20 is unoccupied in this configuration, another supporting plate 38 is arranged approximately horizontally below seat base 20 so as to utilize the upper space for a multi-purpose storage 39. A door 41 that opens upward to the rear is provided in the opening of this multi-purpose storage 39. This multipurpose storage 39 may accommodate a spare battery or other parts, for example. Alternatively, a charger 40 may be kept. For charging, the charger can be taken out from multipurpose storage 39 and set with its plug 42 connected to the power socket and with battery 33 in place, as shown in FIG. 8.

FIG. 6 shows an armrest and its surroundings from an electric motor vehicle according to another embodiment of the present invention, in which the rear-side armrest frame 6b also has a bent portion 27 so that depressed portions 34 on both the front and rear sides of battery 33 can be guided along these armrest frames 6a and 6b. This arrangement holds battery 33 from both the front and rear, preventing the battery from rattling in battery storage portion 23 in a more reliable manner.

Though a long-distance drive is permitted when two batteries 33 are accommodated in both armrest bodies 22, one battery 33 may be set in one of left or right armrest body 22 while a container having the same outside dimensions as battery 33 may be set in the other armrest body 22 as a stuff box 48. This increases the storage space hence, making it possible and convenient to load various items.

As has been described heretofore, according to the present invention, since battery accommodation spaces are formed inside the armrests arranged on both sides of the seat, it is possible to efficiently use the empty spaces inside the armrests and the battery is set at a height that allows the user to easily perform replacement of the battery without bending over.

Since the depressed portions formed on the both sides of the battery are guided by the armrest frames, this configuration makes it possible to mount and remove the battery easily and prevent the battery from rattling inside the battery storage.

Since the armrest and armrest cushion are inclined forwards, the battery by itself leans against the front portion so that the battery is prevented from rattling inside the battery storage.

Since the top handle of the battery projects out above the battery storage portion and can be pressed down by the armrest cushion when the armrest cushion is closed, it is possible to prevent the battery from rattling inside the battery storage and maintain good electric contact.

By providing a multipurpose storage under the seat, it is possible to keep a charger, spare battery or other necessary small items.

What is claimed is:

1. An electric motor vehicle comprising:

a drive unit disposed under a seat having an electric motor as a drive source;

a U-shaped body comprising a flat floor located at a lower portion of said U-shaped body and in front of said seat and a rising portion forming a front of said body;

a plurality of armrests, wherein each said armrest is arranged on each lateral side of the seat;

a battery for supplying electric energy to the electric motor, wherein the front-to-rear dimension of said armrest is longer than the width of said armrest and each armrest has a hollow compartment for battery storage in which the battery can be inserted or removed from the top thereof and has an armrest cushion on the top thereof which serves as a lid that can open and close the battery storage compartment; and the armrest cushion is hinged at the top end of the armrest body so as to open and close the battery storage compartment, at least a front-side piping of an armrest frame is exposed to the interior of the battery storage compartment so as to guide the battery by fitting the piping to a depressed portion formed at least on the front side of the battery.

2. The electric motor vehicle according to claim 1, wherein a stuff box having the same outside dimensions as the battery and formed with a depressed portion on the front side is set in either one of a left and right battery storage compartments of an armrest body.

3. The electric motor vehicle according to claim 1, wherein an armrest body and armrest cushion are inclined forwards so that the battery set in the battery storage compartment can be accommodated in close contact with the armrest frame.

4. The electric motor vehicle according to claim 3, wherein a stuff box having the same outside dimensions as the battery and formed with a depressed portion on the front side is set in either one of a left and right battery storage compartments of an armrest body.

5. The electric motor vehicle according to claim 3, wherein the battery including a handle on the top thereof, the handle projects out above the battery storage compartment when the battery is set in the battery storage compartment and can be covered and urged downward by the armrest cushion when the armrest cushion is closed.

6. The electric motor vehicle according to claim 5, wherein a stuff box having the same outside dimensions as the battery and formed with a depressed portion on the front side is set in either one of a left and right battery storage compartments of an armrest body.

7. The electric motor vehicle according to claim 1, wherein the battery includes a handle on the top thereof, the handle projects out above the battery storage compartment when the battery is set in the battery storage compartment and can be covered and urged downward by the armrest cushion when the armrest cushion is closed.

8. The electric motor vehicle according to claim 7, wherein a stuff box having the same outside dimensions as the battery and formed with a depressed portion on the front side is set in either one of a left and right battery storage compartment of an armrest body.

* * * * *